(12) United States Patent
Marsh

(10) Patent No.: US 10,873,657 B1
(45) Date of Patent: Dec. 22, 2020

(54) PHONE SUPPORT ASSEMBLY

(71) Applicant: Eric Marsh, Taylorsville, UT (US)

(72) Inventor: Eric Marsh, Taylorsville, UT (US)

( * ) Notice: Subject to any disclaimer, the term of this patent is extended or adjusted under 35 U.S.C. 154(b) by 0 days.

(21) Appl. No.: 16/448,055

(22) Filed: Jun. 21, 2019

(51) Int. Cl.
| | |
|---|---|
| *A45F 5/00* | (2006.01) |
| *H04M 1/05* | (2006.01) |
| *F16M 13/04* | (2006.01) |
| *H02S 10/40* | (2014.01) |
| *H02S 10/20* | (2014.01) |
| *H02J 7/35* | (2006.01) |

(52) U.S. Cl.
CPC ............... *H04M 1/05* (2013.01); *A45F 5/00* (2013.01); *F16M 13/04* (2013.01); *H02J 7/35* (2013.01); *H02S 10/20* (2014.12); *H02S 10/40* (2014.12); *A45F 2005/002* (2013.01); *A45F 2200/0516* (2013.01)

(58) Field of Classification Search
CPC .... A45F 2200/0516; A45F 2200/0525; H04M 1/05
See application file for complete search history.

(56) References Cited

U.S. PATENT DOCUMENTS

| | | | | |
|---|---|---|---|---|
| 3,507,424 A | * | 4/1970 | Burkins ................. | A45F 5/00 224/257 |
| 5,074,222 A | * | 12/1991 | Welch ................ | A47B 23/002 108/43 |
| 5,573,158 A | | 11/1996 | Penn | |
| 6,764,231 B1 | * | 7/2004 | Shubert ................ | F16M 13/04 396/419 |
| D558,974 S | | 1/2008 | Denzer | |
| 7,665,641 B2 | | 2/2010 | Kaufman | |
| 8,505,790 B2 | | 8/2013 | Yu | |
| 8,881,961 B1 | | 11/2014 | Cibirka | |
| 9,004,330 B2 | | 4/2015 | White | |
| 9,125,475 B2 | * | 9/2015 | Garza, Jr. ............ | H04B 1/3877 |
| 9,833,058 B2 | * | 12/2017 | Bryant ................ | A45F 3/14 |
| 9,901,796 B2 | * | 2/2018 | Murray ................ | A45F 5/02 |
| 2006/0037987 A1 | * | 2/2006 | Lin ................... | A45C 5/00 224/646 |
| 2010/0025444 A1 | * | 2/2010 | Tipton ................ | A45F 5/00 224/576 |
| 2013/0342969 A1 | * | 12/2013 | Krupich ................ | H04B 1/385 361/679.01 |
| 2015/0341071 A1 | * | 11/2015 | Truchalska ............ | A45F 5/004 455/575.8 |

* cited by examiner

Primary Examiner — Scott T McNurlen

(57) ABSTRACT

A phone support assembly for positioning a screen of a phone for viewing includes a plate. A first strap and a second strap are coupled to and extend from a top and a bottom of the plate, respectively, to define a first loop and a second loop, respectively. The first loop is configured to position around a neck of a user to position the plate on an upper chest region of the user. The second loop is positioned around the user's abdomen to secure the plate. A pair of first bars, which is pivotally coupled to the plate, and a second bar, which is pivotally coupled to the pair of first bars distal from the plate, are selectively angularly positionable. A fastener that is coupled to the second bar is configured to selectively couple to a cellular phone so that the phone's screen is viewable by the user.

12 Claims, 5 Drawing Sheets

PHONE SUPPORT ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

(g) BACKGROUND OF THE INVENTION

(1) Field of the Invention

(2) Description of Related Art Including Information Disclosed Under 37 CFR 1.97 and 1.98

The disclosure and prior art relates to phone support assemblies and more particularly pertains to a new phone support assembly for positioning a screen of a phone for viewing.

BRIEF SUMMARY OF THE INVENTION

An embodiment of the disclosure meets the needs presented above by generally comprising a plate. A first strap and a second strap are coupled to and extend from a top and a bottom of the plate, respectively, to define a first loop and a second loop, respectively. The first loop is configured to position over a head and around a neck of a user so that a back of the plate is positioned on an upper chest region of the user. The second loop is configured to position around an abdomen of the user to couple the plate to the user. A pair of first bars is pivotally coupled to a front of the plate so that the pair of first bars is selectively angularly positionable relative to the plate. A second bar is pivotally coupled to the pair of first bars distal from the plate so that the second bar is selectively angularly positionable relative to the pair of first bars. A fastener that is coupled to the second bar distal from the pair of first bars is configured to selectively couple to a cellular phone so that a screen of the cellular phone is positioned to be viewed by the user.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
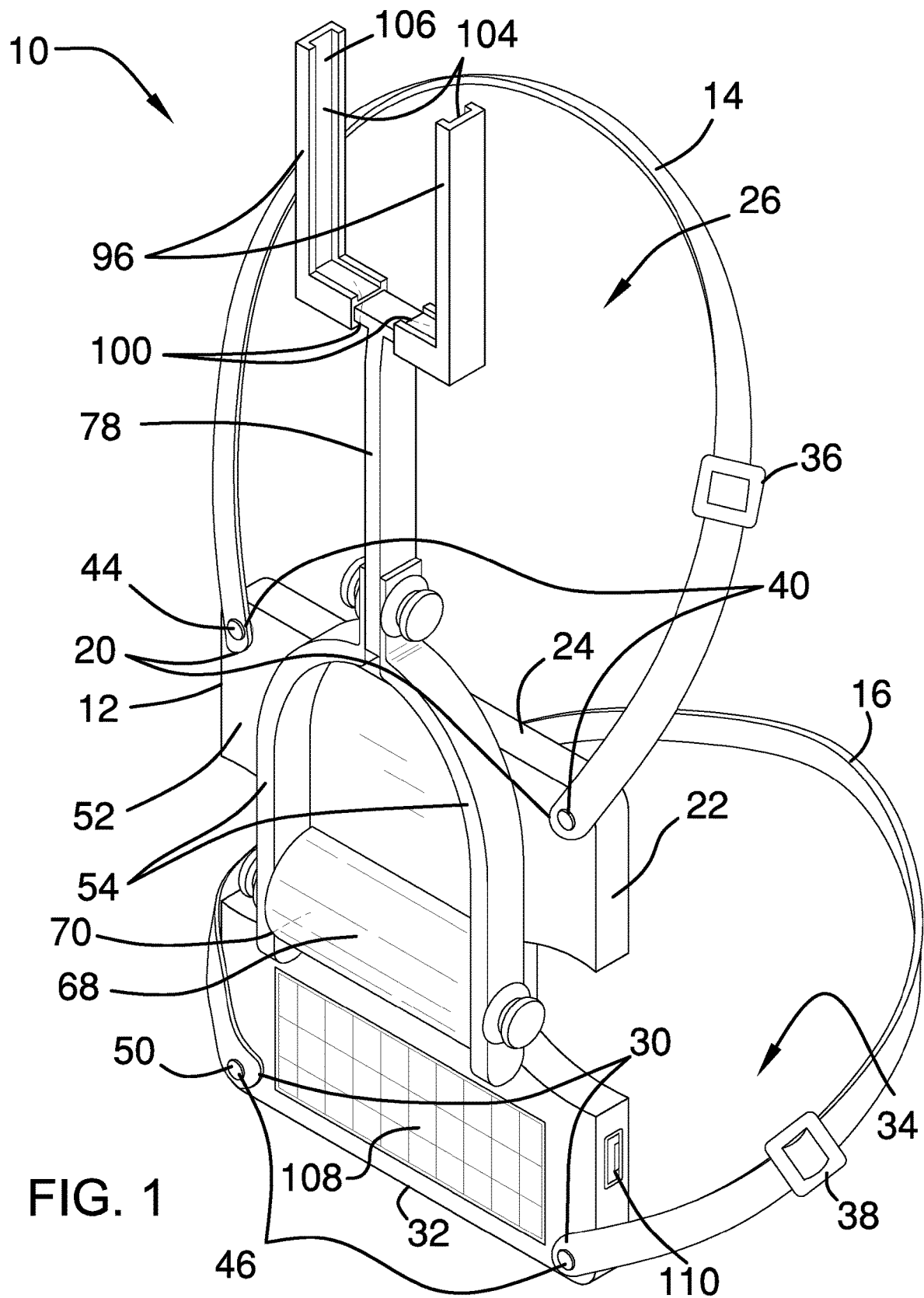
FIG. 1 is an isometric perspective view of a phone support assembly according to an embodiment of the disclosure.
Figure 2:
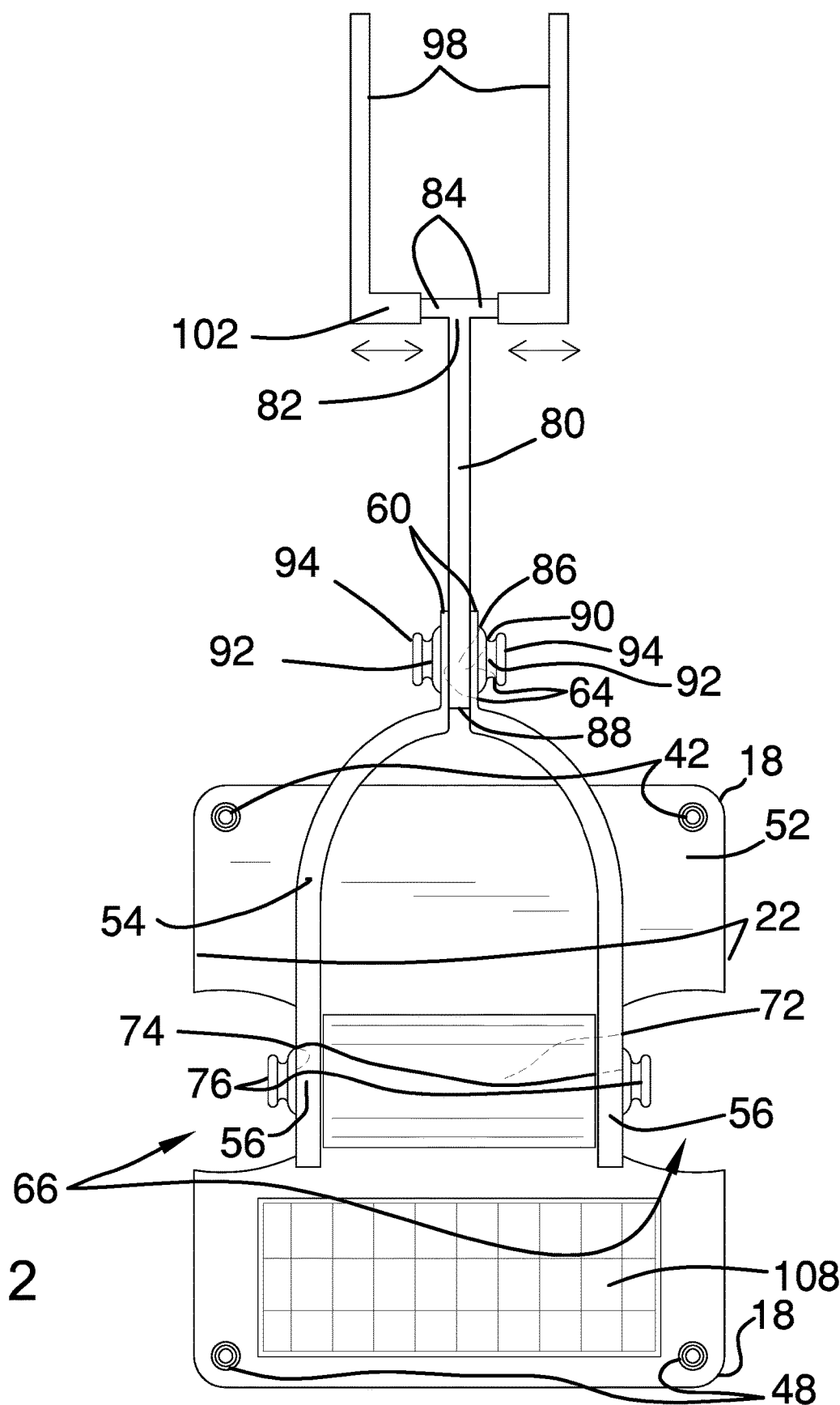
FIG. 2 is a front view of an embodiment of the disclosure.
Figure 3:
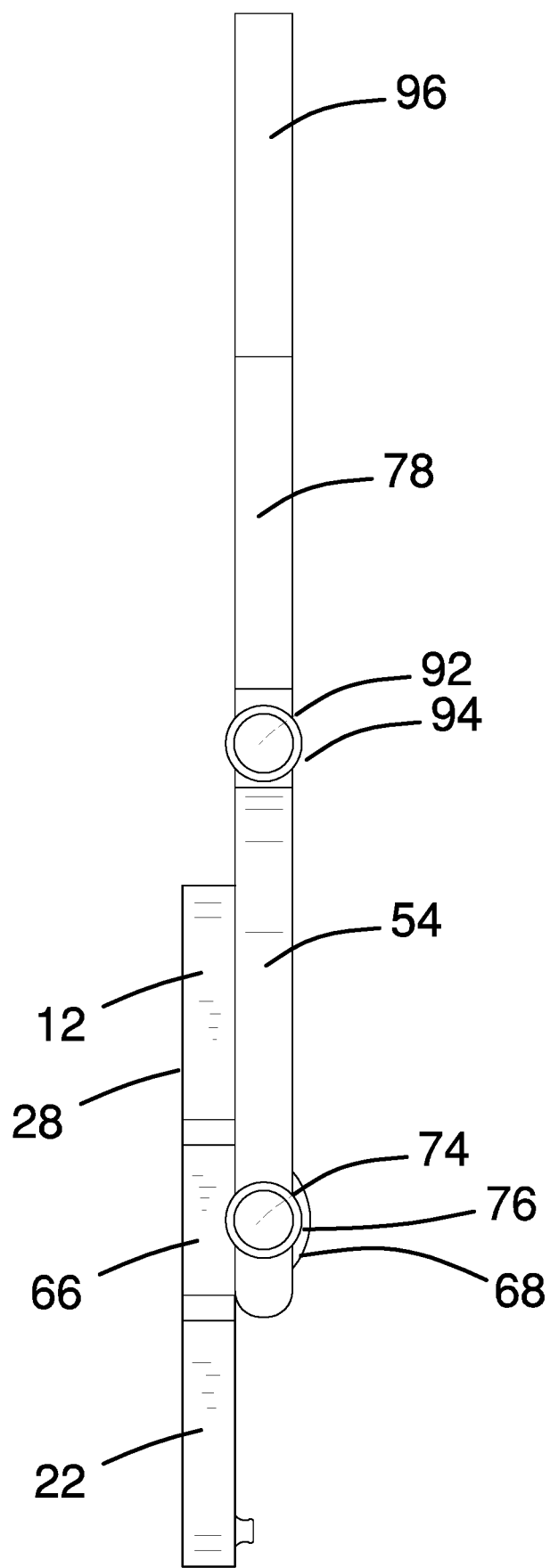
FIG. 3 is a side view of an embodiment of the disclosure.

With reference now to the drawings, and in particular to FIGS. 1 through 5 thereof, a new phone support assembly embodying the principles and concepts of an embodiment of the disclosure and generally designated by the reference numeral 10 will be described.

As best illustrated in FIGS. 1 through 5, the phone support assembly 10 generally comprises a plate 12, a first strap 14, and a second strap 16. The plate 12 is substantially rectangularly shaped and has corners 18 that are arcuate. The first strap 14 has opposing endpoints 20 that are coupled singly proximate to opposing sides 22 and a top 24 of the plate 12 to define a first loop 26. The first loop 26 is configured to position over a head and around a neck of a user so that a back 28 of the plate 12 is positioned on an upper chest region of the user. The second strap 16 has opposing ends 30 that are coupled singly proximate to the opposing sides 22 and a bottom 32 of the plate 12 to define a second loop 34. The second loop 34 is configured to position around an abdomen of the user to couple the plate 12 to the user.

A first buckle 36 is coupled to the first strap 14. The first buckle 36 is selectively couplable to the first strap 14 to selectively size the first loop 26. A second buckle 38 is coupled to the second strap 16. The second buckle 38 is selectively couplable to the second strap 16 to selectively size the second loop 34.

A pair of first connectors 40 is coupled singly proximate to the opposing endpoints 20 of the first strap 14. A pair of second connectors 42 is coupled singly proximate to the opposing sides 22 and the top 24 of the plate 12. The second connectors 42 are complementary to the first connectors 40 so that each second connector 42 is positioned to selectively couple to a respective first connector 40 to removably couple the first strap 14 to the plate 12. The second connector 42 and the respective first connector 40 comprises a first snap fastener 44.

A pair of first couplers 46 is coupled singly proximate to the opposing ends 30 of the second strap 16. A pair of second couplers 48 is coupled singly proximate to the opposing sides 22 and the bottom 32 of the plate 12. The second couplers 48 are complementary to the first couplers 46 so that each second coupler 48 is positioned to selectively couple to a respective first coupler 46 to couple removably the second strap 16 to the plate 12. The second coupler 48 and the respective first coupler 46 comprises a second snap fastener 50. The second connectors 42 and second couplers 48 are positioned on a front 52 of the plate 12.

The first strap 14 and the second strap 16 being removably couplable to the plate 12 facilitates positioning of the plate 12 on the upper chest area of the user and securing the plate 12 to the user. This feature also facilitates the selective sizing of the first loop 26 and the second loop 34 using the first buckle 36 and the second buckle 38, respectively, as this activity is easier to perform when the first strap 14 and second strap 16 are not coupled to the plate 12.

A pair of first bars 54 is pivotally coupled to the front 52 of the plate 12 so that the pair of first bars 54 is selectively angularly positionable relative to the plate 12. Each of a pair of holes 56 is positioned through a respective first bar 54 proximate to a first end 58 of the respective first bar 54. Viewed together, the pair of first bars 54 is substantially U-shaped. Each of a pair of tabs 60 is coupled to and extends from a second end 62 of a respective first bar 54 so that the tabs 60 of the pair of tabs 60 are parallel. Each of a pair of first orifices 64 is positioned in a respective tab 60.

Each of a pair of cutouts 66, which are arcuate, extends into a respective opposing side 22 of the plate 12 substantially equally distant from the top 24 and the bottom 32 of the plate 12. A protrusion 68, which is half-cylindrically shaped, is coupled to the front 52 of the plate 12 and extends between the pair of cutouts 66. A channel 70 extends longitudinally through the protrusion 68.

Figure 4:
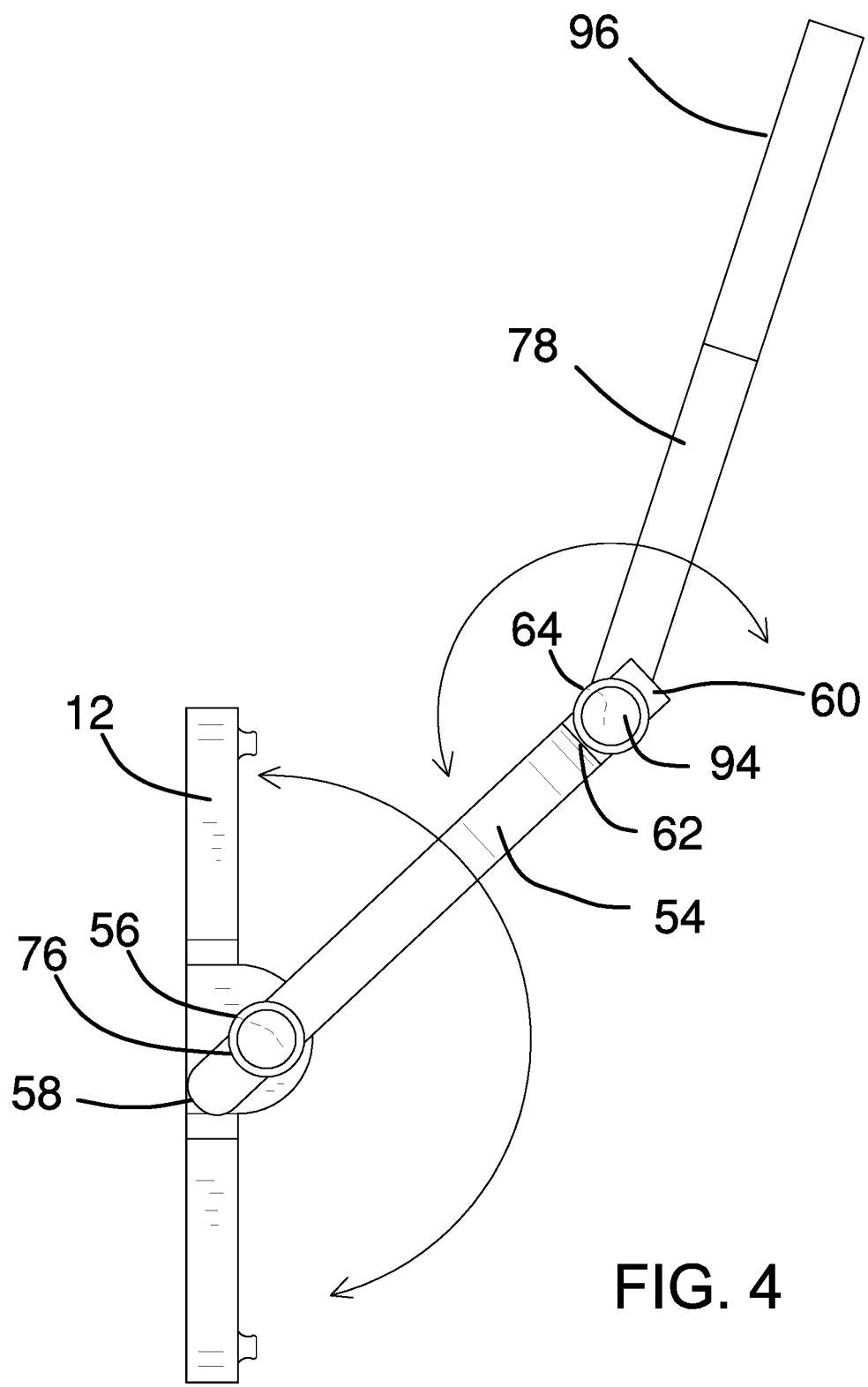
FIG. 4 is a side view of an embodiment of the disclosure.

A proximal rod 72 is positioned in the channel 70 and extends through the pair of holes 56. The proximal rod 72 is threaded adjacent to opposing termini 74 of the proximal rod 72. Each of a pair of proximal knobs 76 is selectively threadedly couplable to a respective opposing terminus 74 of the proximal rod 72. When untightened, the pair of proximal knobs 76 allows the pair of first bars 54 to be selectively positionable transversely to the plate 12, such that the pair of first bars 54 extends outwardly and upwardly from the upper chest area of the user, as shown in FIG. 4. The cutouts 66 prevent the first ends 58 of the first bars 54 from contacting the plate 12, as shown in FIG. 4. The proximal knobs 76 are configured to be selectively rotated relative to the proximal rod 72 to frictionally couple the pair of first bars 54 to the protrusion 68 to fixedly position the pair of first bars 54 relative to the plate 12.

A second bar 78 is pivotally coupled to the pair of first bars 54 distal from the plate 12 so that the second bar 78 is selectively angularly positionable relative to the pair of first bars 54. The second bar 78 comprises a first section 80 that is coupled to and bisects a second section 82 to define a pair of tenons 84. A second orifice 86 is positioned in the second bar 78 proximate to a first endpoint 88 of the second bar 78.

A distal rod 90 is positioned through the pair of first orifices 64 and the second orifice 86. The distal rod 90 is threaded adjacent to opposing tips 92 of the distal rod 90. Each of a pair of distal knobs 94 is selectively threadedly couplable to a respective opposing tip 92 of the distal rod 90. When untightened, the pair of distal knobs 94 allows the second bar 78 to be selectively positionable transversely to the pair of first bars 54 so that the second extends outwardly and upwardly from the upper chest area of the user, as shown in FIG. 4. The distal knobs 94 are configured to be selectively rotated relative to the distal rod 90 to frictionally couple the pair of tabs 60 to the second bar 78 to fixedly position the second bar 78 relative to the pair of first bars 54.

A fastener 96 that is coupled to the second bar 78 distal from the pair of first bars 54 is configured to selectively couple to a cellular phone so that a screen of the cellular phone is positioned to be viewed by the user. The cellular phone, being coupled to the fastener 96, is configured for hands free use. The pivotability of first bars 54 and the second bar 78 allows the user to selectively position the cellular phone at a comfortable height, as well as at a comfortable distance, for viewing.

Figure 5:
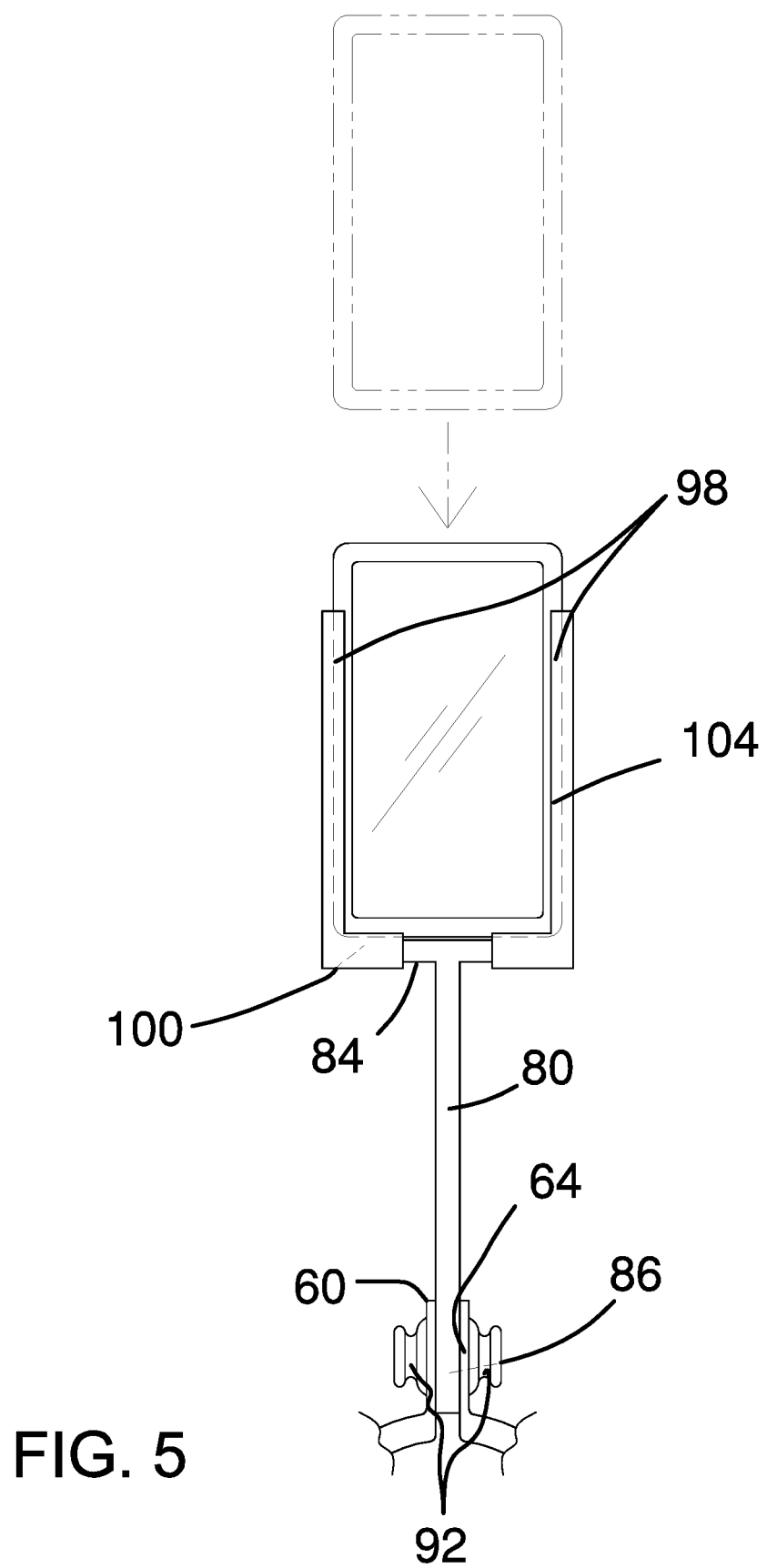
FIG. 5 is a detail view of an embodiment of the disclosure.

The fastener 96 comprises a pair of slats 98, which are L-shaped. Each of a pair of mortices 100 is positioned in a short segment 102 of a respective slat 98 so that the mortice 100 is positioned to insert a respective tenon 84 to slidably couple the respective slat 98 to the second bar 78. Each of a pair of recesses 104 extends into an inner face 106 of a respective slat 98. The pair of slats 98 is positioned to slide relative to the second section 82 of the second bar 78, allowing the user to position the cellular phone in the pair of recesses 104, as shown in FIG. 5. The pair of slats 98 is configured to frictionally couple the cellular phone to the second bar 78. The cellular phone can be positioned in either a portrait position or landscape orientation.

A solar panel 108 that is coupled to the front 52 of the plate 12, proximate to the bottom 32 of the plate 12, is operationally coupled to a port 110 that is coupled to a respective opposing side 22 the plate 12. The port 110 is configured to couple to a charging cord that extends from the cellular phone, positioning the solar panel 108 to charge a battery of the cellular phone.

In use, the first loop 26 is positioned around the neck of the user and the second loop 34 is positioned around the abdomen of the user to couple the plate 12 to the user. The pair of proximal knobs 76 is loosened to allow the pair of first bars 54 to be selectively positioned transversely to the plate 12, and then tightened to fixedly position the pair of first bars 54 relative to the plate 12. The pair of distal knobs 94 is loosened to allow the second bar 78 to be selectively positioned transversely to the pair of first bars 54, and then tightened to fixedly position the second bar 78 relative to the pair of first bars 54. The pair of slats 98 is positioned to allow insertion of the cellular phone into the pair of recesses 104, and then slid toward the cellular phone to frictionally couple the cellular phone to the second bar 78.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A phone support assembly comprising:
   a plate;
   a first strap having opposing endpoints coupled singly proximate to opposing sides and a top of the plate defining a first loop wherein the first loop is configured for positioning over a head and around a neck of a user such that a back of the plate is positioned on an upper chest region of the user;
   a second strap having opposing ends coupled singly proximate to the opposing sides and a bottom of the plate defining a second loop wherein the second loop is configured for positioning around an abdomen of the user for coupling the plate to the user;
   a pair of first bars pivotally coupled to a front of the plate such that the pair of first bars is selectively angularly positionable relative to the plate;
   a second bar pivotally coupled to the pair of first bars distal from the plate such that the second bar is selectively angularly positionable relative to the pair of first bars;
   a fastener coupled to the second bar distal from the pair of first bars, the fastener being configured for selectively coupling to a cellular phone such that a screen of the cellular phone is positioned for viewing by the user;
   a pair of holes, each hole being positioned through a respective first bar proximate to a first end of the respective first bar;
   a pair of cutouts, each cutout extending into a respective opposing side of the plate equally distant from the top and the bottom of the plate;
   a protrusion coupled to the front of the plate, the protrusion being half-cylindrically shaped, the protrusion extending between the pair of cutouts;
   a channel extending longitudinally through the protrusion;
   a proximal rod positioned in the channel and extending through the pair of holes, the proximal rod being threaded adjacent to opposing termini of the proximal rod; and
   a pair of proximal knobs, each proximal knob being selectively threadedly couplable to a respective opposing terminus of the proximal rod such that the pair of first bars is selectively positionable transversely to the plate such that the pair of first bars extends outwardly and upwardly from the upper chest area of the user wherein the proximal knobs are configured for being selectively rotated relative to the proximal rod for frictionally coupling the pair of first bars to the protrusion for fixedly positioning the pair of first bars relative to the plate.

2. The assembly of claim 1, further including the plate being rectangularly shaped, the plate having corners, the corners being arcuate.

3. The assembly of claim 1, further comprising:
   a first buckle coupled to the first strap, the first buckle being selectively couplable to the first strap for selectively sizing the first loop; and
   a second buckle coupled to the second strap, the second buckle being selectively couplable to the second strap for selectively sizing the second loop.

4. The assembly of claim 1, further comprising:
   a pair of first connectors coupled singly proximate to the opposing endpoints of the first strap;
   a pair of second connectors coupled singly proximate to the opposing sides and the top of the plate, the second connectors being complementary to the first connectors wherein each second connector is positioned for selectively coupling to a respective first connector for removably coupling the first strap to the plate;
   a pair of first couplers coupled singly proximate to the opposing ends of the second strap; and
   a pair of second couplers coupled singly proximate to the opposing sides and the bottom of the plate, the second couplers being complementary to the first couplers wherein each second coupler is positioned for selectively coupling to a respective first coupler for removably coupling the second strap to the plate.

5. The assembly of claim 4, further comprising:
   the second connector and the respective first connector comprising a first snap fastener; and
   the second coupler and the respective first coupler comprising a second snap fastener.

6. The assembly of claim 4, further including the second connectors and second couplers being positioned on the front of the plate.

7. The assembly of claim 1, further including the cutouts being arcuate.

8. The assembly of claim 1, further comprising:
   the pair of first bars being U-shaped;
   a pair of tabs, each tab being coupled to and extending from a second end of a respective first bar such that the tabs of the pair of tabs are parallel;
   a pair of first orifices, each first orifice being positioned in a respective tab;
   a second orifice positioned in the second bar proximate to a first endpoint of the second bar;
   a distal rod positioned through the pair of first orifices and the second orifice, the distal rod being threaded adjacent to opposing tips of the distal rod; and
   a pair of distal knobs, each distal knob being selectively threadedly couplable to a respective opposing tip of the distal rod such that the second bar is selectively positionable transversely to the pair of first bars such that the second bar extends outwardly and upwardly from the upper chest area of the user wherein the distal knobs are configured for being selectively rotated relative to the distal rod for frictionally coupling the pair of tabs to the second bar for fixedly positioning the second bar relative to the pair of first bars.

9. The assembly of claim 1, further comprising:
   the second bar comprising a first section coupled to and bisecting a second section defining a pair of tenons; and
   the fastener comprising:
      a pair of slats, the slats being L-shaped,
      a pair of mortices, each mortice being positioned in a short segment of a respective slat such that the mortice is positioned for inserting a respective tenon for slidably coupling the respective slat to the second bar, and
      a pair of recesses, each recess extending into an inner face of a respective slat such that the pair of slats is positioned for sliding relative to the second section of the second bar for positioning a cellular phone in the pair of recesses wherein the pair of slats is configured for frictionally coupling the cellular phone to the second bar.

10. The assembly of claim 1, further comprising:
    a solar panel coupled to the front of the plate; and
    a port coupled to the plate, the port being operationally coupled to the solar panel wherein the port is configured for coupling to a charging cord extending from the cellular phone positioning the solar panel for charging a battery of the cellular phone.

11. The assembly of claim 1, further comprising:
the solar panel being positioned proximate to the bottom of the plate; and
the port being coupled to a respective opposing side of the plate.

12. A phone support assembly comprising:
a plate, the plate being rectangularly shaped, the plate having corners, the corners being arcuate;
a first strap having opposing endpoints coupled singly proximate to opposing sides and a top of the plate defining a first loop wherein the first loop is configured for positioning over a head and around a neck of a user such that a back of the plate is positioned on an upper chest region of the user;
a first buckle coupled to the first strap, the first buckle being selectively couplable to the first strap for selectively sizing the first loop;
a pair of first connectors coupled singly proximate to the opposing endpoints of the first strap;
a pair of second connectors coupled singly proximate to the opposing sides and the top of the plate, the second connectors being complementary to the first connectors wherein each second connector is positioned for selectively coupling to a respective first connector for removably coupling the first strap to the plate, the second connector and the respective first connector comprising a first snap fastener, the second connectors being positioned on a front of the plate;
a second strap having opposing ends coupled singly proximate to the opposing sides and a bottom of the plate defining a second loop wherein the second loop is configured for positioning around an abdomen of the user for coupling the plate to the user;
a second buckle coupled to the second strap, the second buckle being selectively couplable to the second strap for selectively sizing the second loop;
a pair of first couplers coupled singly proximate to the opposing ends of the second strap;
a pair of second couplers coupled singly proximate to the opposing sides and the bottom of the plate, the second couplers being complementary to the first couplers wherein each second coupler is positioned for selectively coupling to a respective first coupler for removably coupling the second strap to the plate, the second coupler and the respective first coupler comprising a second snap fastener, the second couplers being positioned on the front of the plate;
a pair of first bars pivotally coupled to the front of the plate such that the pair of first bars is selectively angularly positionable relative to the plate, the pair of first bars being U-shaped;
a pair of holes, each hole being positioned through a respective first bar proximate to a first end of the respective first bar;
a pair of cutouts, each cutout extending into a respective opposing side of the plate equally distant from the top and the bottom of the plate, the cutouts being arcuate;
a protrusion coupled to the front of the plate, the protrusion being half-cylindrically shaped, the protrusion extending between the pair of cutouts;
a channel extending longitudinally through the protrusion;
a proximal rod positioned in the channel and extending through the pair of holes, the proximal rod being threaded adjacent to opposing termini of the proximal rod;
a pair of proximal knobs, each proximal knob being selectively threadedly couplable to a respective opposing terminus of the proximal rod such that the pair of first bars is selectively positionable transversely to the plate such that the pair of first bars extends outwardly and upwardly from the upper chest area of the user wherein the proximal knobs are configured for being selectively rotated relative to the proximal rod for frictionally coupling the pair of first bars to the protrusion for fixedly positioning the pair of first bars relative to the plate;
a second bar pivotally coupled to the pair of first bars distal from the plate such that the second bar is selectively angularly positionable relative to the pair of first bars, the second bar comprising a first section coupled to and bisecting a second section defining a pair of tenons;
a pair of tabs, each tab being coupled to and extending from a second end of a respective first bar such that the tabs of the pair of tabs are parallel;
a pair of first orifices, each first orifice being positioned in a respective tab;
a second orifice positioned in the second bar proximate to a first endpoint of the second bar;
a distal rod positioned through the pair of first orifices and the second orifice, the distal rod being threaded adjacent to opposing tips of the distal rod;
a pair of distal knobs, each distal knob being selectively threadedly couplable to a respective opposing tip of the distal rod such that the second bar is selectively positionable transversely to the pair of first bars such that the second bar extends outwardly and upwardly from the upper chest area of the user wherein the distal knobs are configured for being selectively rotated relative to the distal rod for frictionally coupling the pair of tabs to the second bar for fixedly positioning the second bar relative to the pair of first bars;
a fastener coupled to the second bar distal from the pair of first bars, the fastener being configured for selectively coupling to a cellular phone such that a screen of the cellular phone is positioned for viewing by the user, the fastener comprising:
a pair of slats, the slats being L-shaped,
a pair of mortices, each mortice being positioned in a short segment of a respective slat such that the mortice is positioned for inserting a respective tenon for slidably coupling the respective slat to the second bar, and
a pair of recesses, each recess extending into an inner face of a respective slat such that the pair of slats is positioned for sliding relative to the second section of the second bar for positioning a cellular phone in the pair of recesses wherein the pair of slats is configured for frictionally coupling the cellular phone to the second bar;
a solar panel coupled to the front of the plate, the solar panel being positioned proximate to the bottom of the plate; and
a port coupled to the plate, the port being operationally coupled to the solar panel wherein the port is configured for coupling to a charging cord extending from the cellular phone positioning the solar panel for charging a battery of the cellular phone, the port being coupled to a respective opposing side of the plate.

* * * * *